(12) United States Patent
Igarashi

(10) Patent No.: US 11,764,594 B2
(45) Date of Patent: Sep. 19, 2023

(54) ELECTRONIC DEVICE, BATTERY CONDITION DISPLAY METHOD, AND PRINTING APPARATUS

(71) Applicant: SEIKO EPSON CORPORATION, Tokyo (JP)

(72) Inventor: Masahiro Igarashi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 16/715,920

(22) Filed: Dec. 16, 2019

(65) Prior Publication Data
US 2020/0195028 A1   Jun. 18, 2020

(30) Foreign Application Priority Data

Dec. 17, 2018 (JP) ................................ 2018-235836

(51) Int. Cl.
*H02J 7/00* (2006.01)
*G06K 15/00* (2006.01)

(52) U.S. Cl.
CPC ........ *H02J 7/0048* (2020.01); *G06K 15/4055* (2013.01); *H02J 7/0013* (2013.01); *H02J 7/00045* (2020.01)

(58) Field of Classification Search
CPC ........ H02J 7/0044; H02J 7/005; H02J 7/0042; H02J 7/0048; H02J 7/0013; H02J 7/00045; H01M 2010/4271; H01M 10/425; G06K 15/4055
USPC ........................................................ 320/107
See application file for complete search history.

(56) References Cited

U.S. PATENT DOCUMENTS

| 6,134,105 | A  | * | 10/2000 | Lueker .................. | A45C 7/0054 206/320 |
| 6,545,445 | B1 | * | 4/2003  | McDermott ........ | F02N 11/0866 320/103 |
| 8,816,646 | B2 | * | 8/2014  | Kamijima ......... | H02J 7/007194 320/124 |
| 9,009,417 | B2 | * | 4/2015  | Okawa ................ | G06F 11/2089 711/143 |
| 9,515,509 | B2 | * | 12/2016 | Nagai ........................ | H02J 7/04 |
| 9,857,863 | B2 | * | 1/2018  | Kobayashi ............ | G06F 1/1635 |

(Continued)

FOREIGN PATENT DOCUMENTS

| CN | 102159961 A | * | 8/2011  | ......... G01R 31/3646 |
| CN | 110350626 A | * | 10/2019 | ............ H02J 7/0013 |

(Continued)

*Primary Examiner* — M Baye Diao
(74) *Attorney, Agent, or Firm* — WORKMAN NYDEGGER

(57) ABSTRACT

An electronic device, which can charge a battery selected from a plurality of batteries and can drive the battery as a power feeding source, includes a control unit and a display unit. When a remaining power of a second battery that does not correspond to a first battery selected as a battery to be charged or the power feeding source among the plurality of batteries is higher than or equal to a predetermined threshold value, the control unit causes the display unit to display a remaining power of the first battery from among the remaining power of the first battery and the remaining power of the second battery, and when the remaining power of the second battery is lower than the threshold value, the control unit causes the display unit to display the remaining power of the first battery and the remaining power of the second battery.

7 Claims, 11 Drawing Sheets

(56) References Cited

U.S. PATENT DOCUMENTS

| | | | |
|---|---|---|---|
| 10,199,845 B2 * | 2/2019 | Masaoka | H02J 7/0048 |
| 10,358,043 B2 * | 7/2019 | Dao | B60L 58/15 |
| 10,472,015 B1 * | 11/2019 | Sonderegger | B62J 99/00 |
| 11,539,226 B2 * | 12/2022 | Sun | H01M 10/425 |
| 2001/0055978 A1 * | 12/2001 | Herrod | G07G 1/0018 |
| | | | 455/517 |
| 2007/0063676 A1 * | 3/2007 | Davani | G01R 31/3646 |
| | | | 320/149 |
| 2008/0084183 A1 * | 4/2008 | Hoffman | H02J 7/0042 |
| | | | 320/116 |
| 2008/0315840 A1 * | 12/2008 | Mori | H02J 7/0048 |
| | | | 320/136 |
| 2009/0214912 A1 * | 8/2009 | Horiguchi | G03B 17/18 |
| | | | 429/429 |
| 2009/0279883 A1 * | 11/2009 | Fujita | H04N 5/907 |
| | | | 396/279 |
| 2009/0284225 A1 * | 11/2009 | Nakanuma | H01M 10/441 |
| | | | 320/134 |
| 2011/0009172 A1 * | 1/2011 | Song | H04M 1/72427 |
| | | | 455/573 |
| 2012/0078550 A1 * | 3/2012 | Weymans | H01M 10/488 |
| | | | 702/63 |
| 2012/0271723 A1 * | 10/2012 | Penilla | B60L 53/305 |
| | | | 705/16 |
| 2013/0021737 A1 * | 1/2013 | Kokuryu | H01M 10/488 |
| | | | 361/679.26 |
| 2014/0028681 A1 * | 1/2014 | Hirayama | G01R 31/382 |
| | | | 345/440 |
| 2014/0035513 A1 * | 2/2014 | Kroenke | H02J 7/0049 |
| | | | 320/107 |
| 2016/0022889 A1 * | 1/2016 | Bluvshtein | G01K 7/36 |
| | | | 600/16 |
| 2016/0285285 A1 * | 9/2016 | Mizoguchi | H02J 7/00 |
| 2016/0291666 A1 * | 10/2016 | Hosoya | G06F 1/163 |
| 2017/0203661 A1 * | 7/2017 | Nishinaka | B60L 53/305 |
| 2019/0033395 A1 * | 1/2019 | Karner | G08B 13/1418 |
| 2019/0097447 A1 * | 3/2019 | Partovi | H01F 27/2823 |
| 2019/0379216 A1 * | 12/2019 | Yoon | G06F 1/1632 |
| 2021/0188068 A1 * | 6/2021 | Yoshizumi | B60L 50/64 |

FOREIGN PATENT DOCUMENTS

| | | | | |
|---|---|---|---|---|
| EP | 2099112 B1 | * | 9/2016 | G06F 1/1626 |
| JP | 2004229449 A | * | 8/2004 | H01M 10/42 |
| JP | 2009-103564 | | 5/2009 | |
| JP | 2014-055816 | | 3/2014 | |
| KR | 20070117260 A | * | 12/2007 | H02J 7/00045 |
| KR | 20100030376 A | * | 3/2010 | H02J 7/00712 |
| KR | 101725905 B1 | * | 4/2017 | H02J 7/0042 |
| TW | I556090 B | * | 1/2016 | G06F 1/3212 |

* cited by examiner

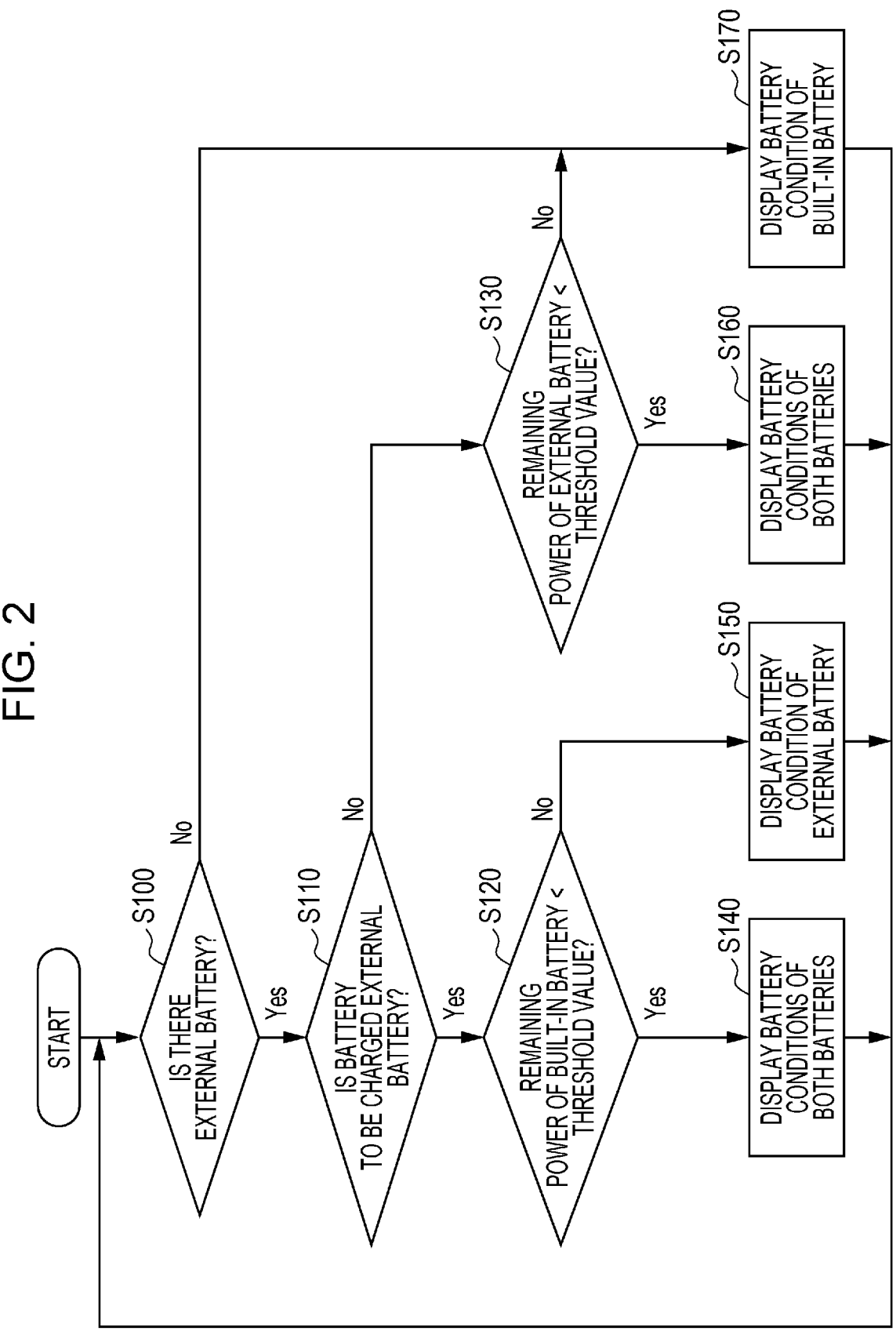

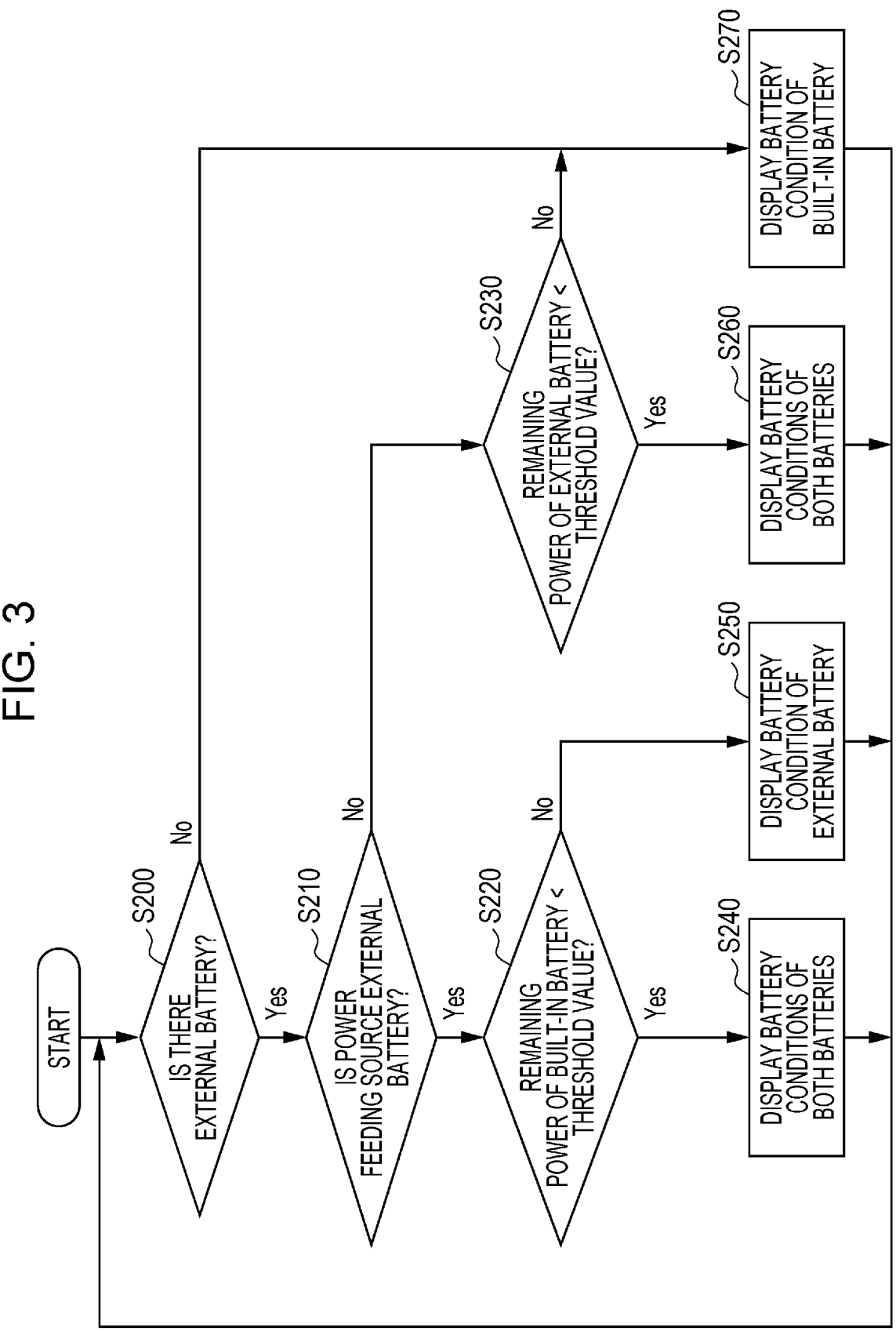

FIG. 4

| ICON 30 OF BUILT-IN BATTERY | ICON 40 OF EXTERNAL BATTERY | MEANING |
|---|---|---|
|  |  | REMAINING POWER LEVEL SLIGHT |
|  |  | REMAINING POWER LEVEL 1 |
|  |  | REMAINING POWER LEVEL 2 |
|  |  | REMAINING POWER LEVEL 3 |
| 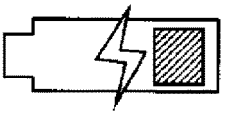 |  | BEING CHARGED AND REMAINING POWER LEVEL SLIGHT |
| 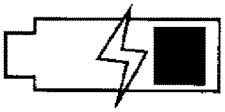 |  | BEING CHARGED AND REMAINING POWER LEVEL 1 |
|  |  | BEING CHARGED AND REMAINING POWER LEVEL 2 |
|  |  | BEING CHARGED AND REMAINING POWER LEVEL 3 |
|  |  | TEMPERATURE ABNORMALITY OR ANOTHER ERROR |
|  |  | AUTHENTICATION FAILURE |

FIG. 5
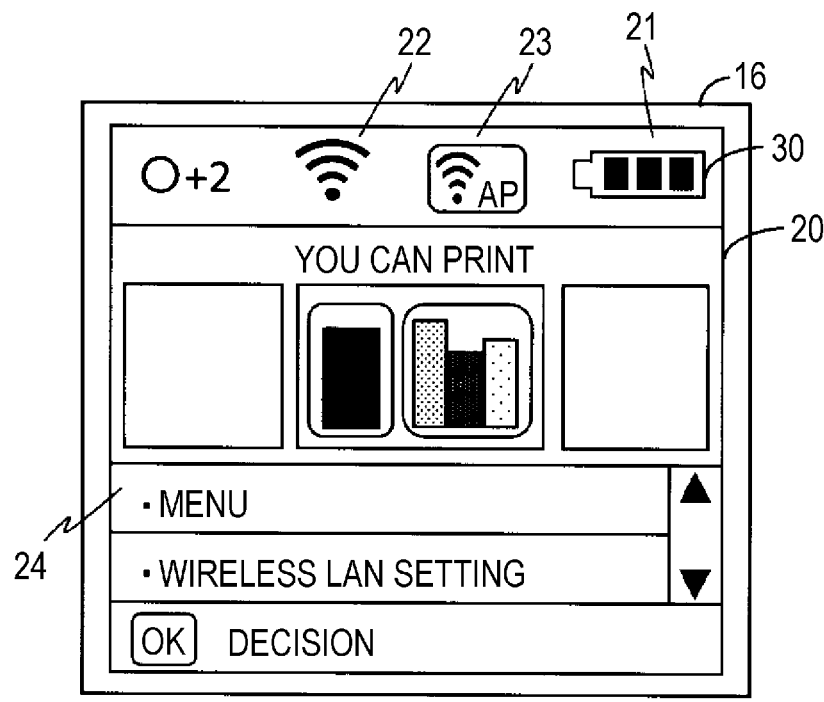
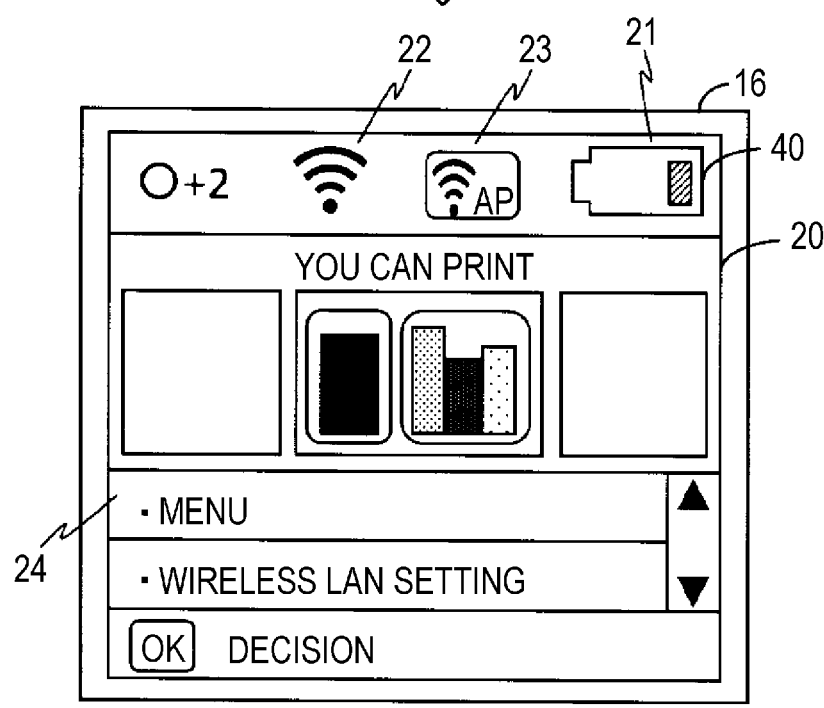

FIG. 7
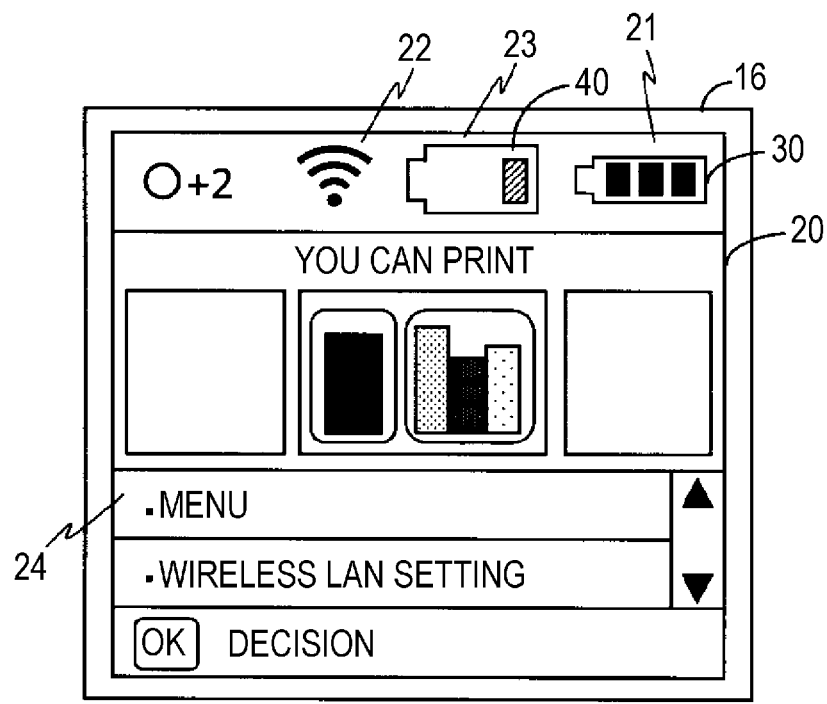
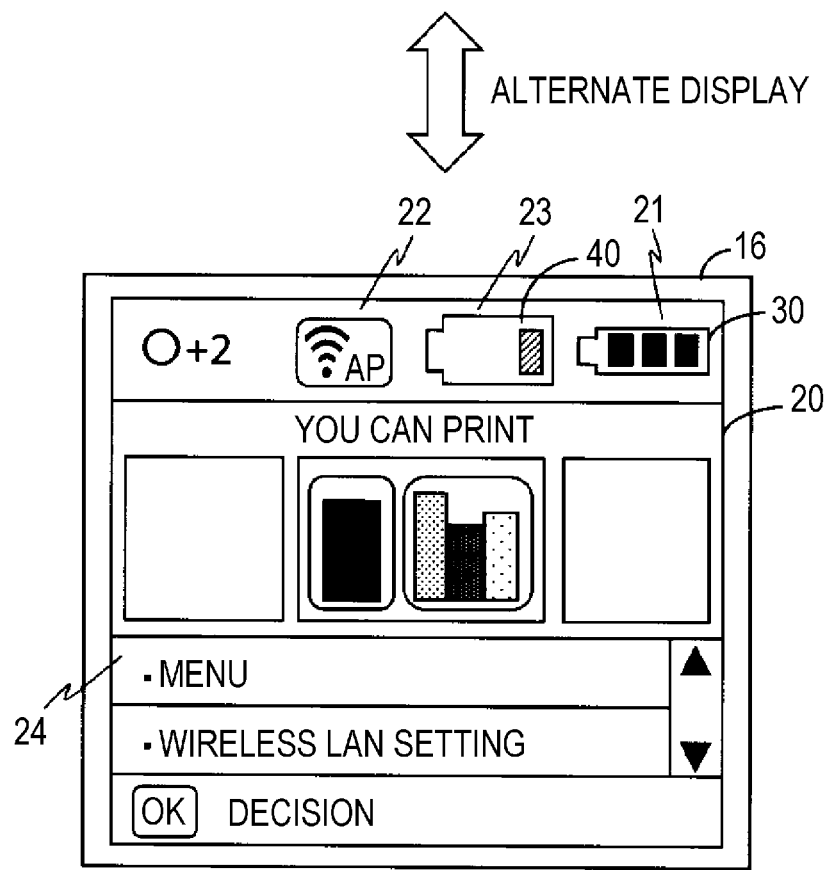

FIG. 8
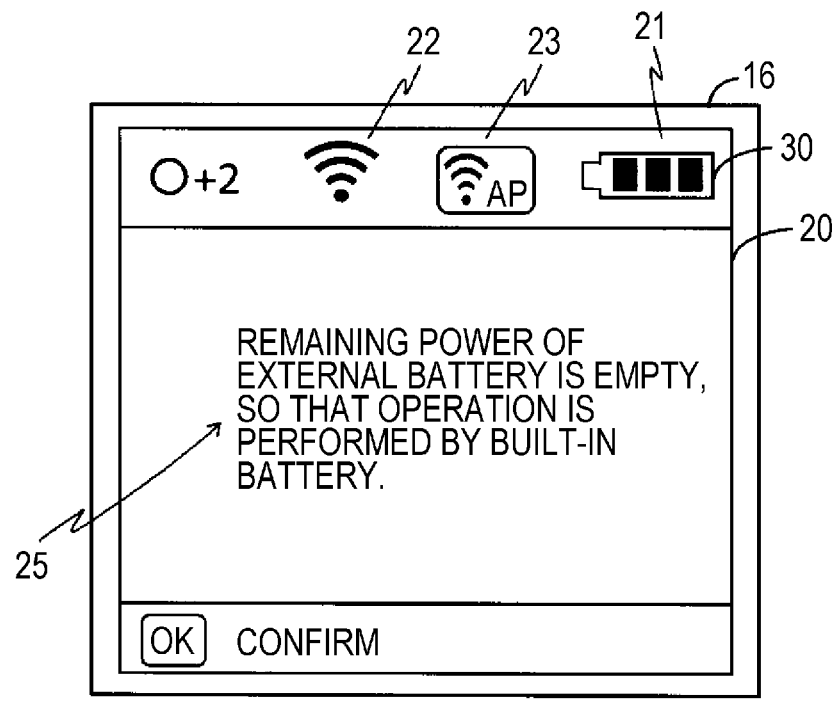
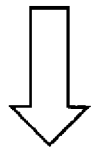
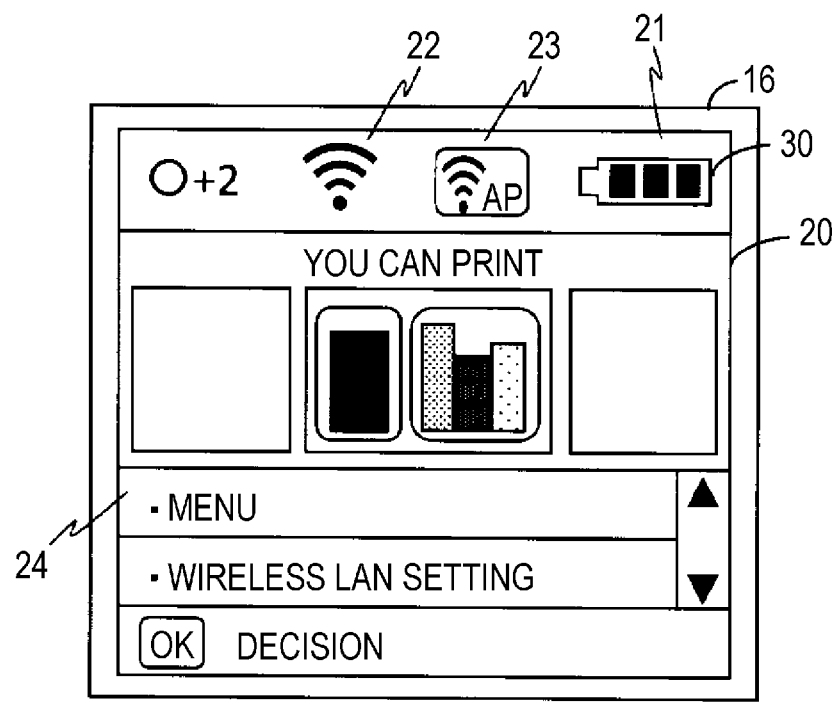

FIG. 11
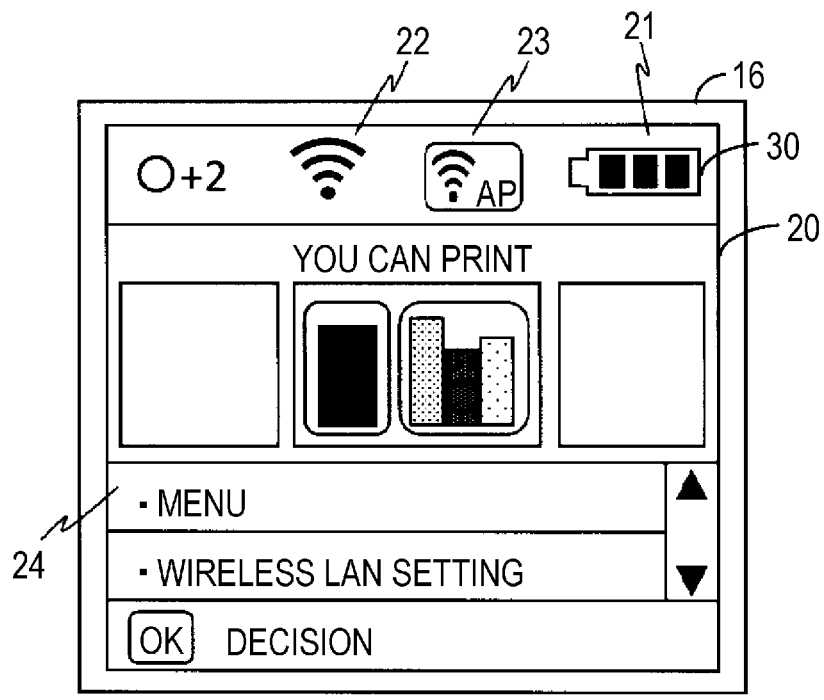
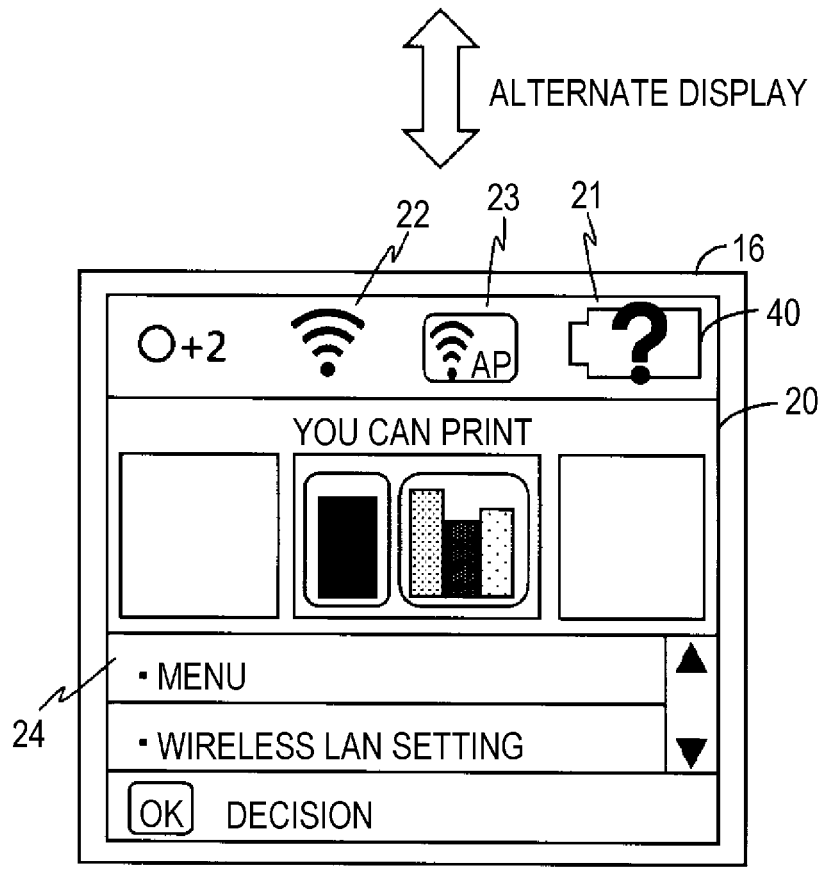

ELECTRONIC DEVICE, BATTERY CONDITION DISPLAY METHOD, AND PRINTING APPARATUS

The present application is based on, and claims priority from JP Application Serial Number 2018-235836, filed Dec. 17, 2018, the disclosure of which is hereby incorporated by reference herein in its entirety.

BACKGROUND

1. Technical Field

The present disclosure relates to an electronic device, a battery condition display method, and a printing apparatus.

2. Related Art

An information processing apparatus is disclosed where a plurality of batteries can be mounted and which causes a display unit to display an image including a first area that displays remaining power of a battery in use and a second area that overlaps with at least a part of the first area and displays total remaining power of a plurality of batteries as a battery remaining power image (see JP-A-2014-55816).

A display unit included in an electronic device is required to display various information besides battery remaining power, and the size of the display unit is limited. Therefore, when the remaining powers of a plurality of batteries used by the electronic device are displayed on the display unit at all times, viewability (visibility) of the display unit may be degraded. On the other hand, there may be cases where it is more appropriate to actively notify a user of a condition of the battery. That is to say, it is required to notify a user of much-needed information without degrading the visibility of the display unit including the display of battery remaining power.

SUMMARY

An electronic device, which can charge a battery selected from a plurality of batteries and can drive a battery selected from the plurality of batteries as a power feeding source, includes a control unit and a display unit. When a remaining power of a second battery that does not correspond to a first battery selected as a battery to be charged or the power feeding source among the plurality of batteries is higher than or equal to a predetermined threshold value, the control unit causes the display unit to display a remaining power of the first battery from among the remaining power of the first battery and the remaining power of the second battery, and when the remaining power of the second battery is lower than the threshold value, the control unit causes the display unit to display the remaining power of the first battery and the remaining power of the second battery.

BRIEF DESCRIPTION OF THE DRAWINGS

FIG. 2 is a flowchart showing battery condition display processing of a first embodiment in an external power supply drive mode.

FIG. 3 is a flowchart showing battery condition display processing of the first embodiment in a battery drive mode.

FIG. 4 is a diagram showing an example of icons corresponding to conditions of batteries.

FIG. 5 is a diagram showing a UI screen of a first example.

FIG. 7 is a diagram showing a UI screen of a third example.

FIG. 8 is a diagram showing a UI screen of a fourth example.

FIG. 11 is a diagram showing a UI screen of a fifth example.

DESCRIPTION OF EXEMPLARY EMBODIMENTS

Hereinafter, embodiments of the present disclosure will be described with reference to the drawings. Each drawing is only an example for describing the embodiments.

1. Schematic Configuration of Electronic Device

Figure 1:
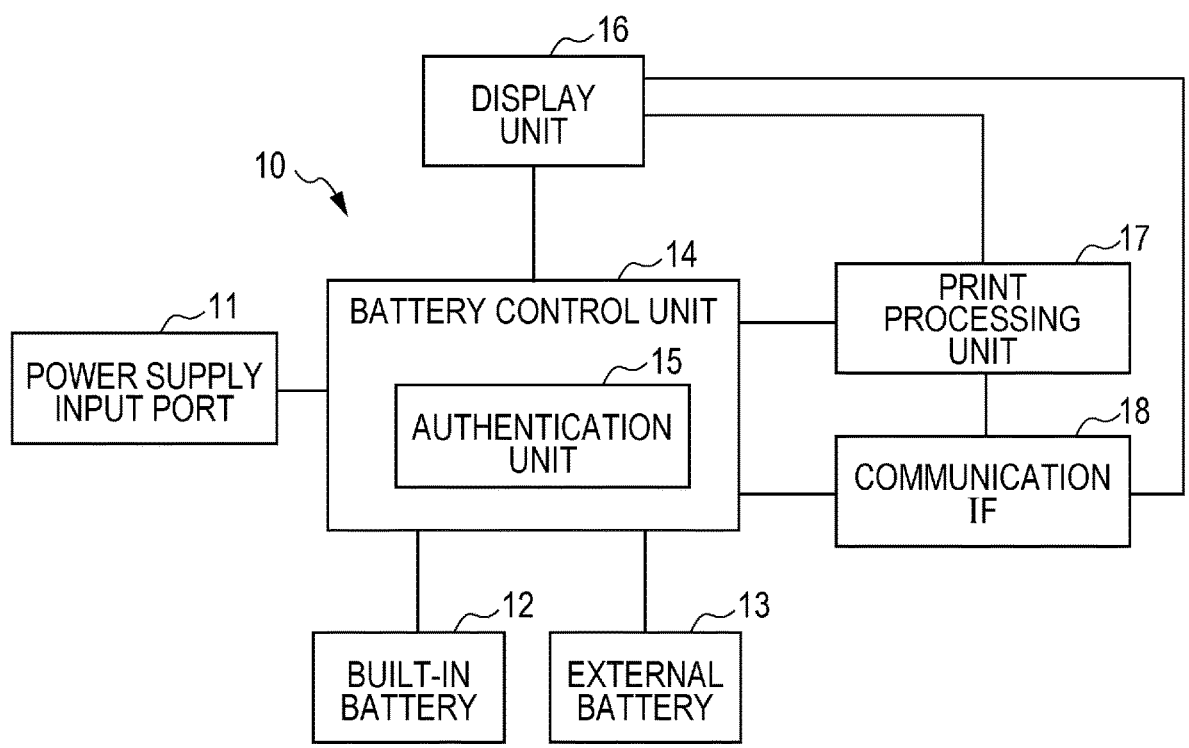
FIG. 1 is a block diagram simply showing a configuration of an electronic device.

FIG. 1 simply shows a configuration of an electronic device 10 according to an embodiment. The electronic device 10 is a product such as, for example, a mobile type printer or scanner and can operate by receiving power from a battery. The battery is also called a storage battery, a rechargeable battery, or a secondary battery.

The electronic device 10 includes a power supply input port 11, a built-in battery 12, a battery control unit 14, a display unit 16, a print processing unit 17, and a communication interface 18. The interface is abbreviated as IF. The electronic device 10 has the print processing unit 17, so that the electronic device 10 corresponds to a printer. The printer is also called a printing apparatus 10. As shown in FIG. 1, the electronic device 10 can be coupled to an external battery 13 used as an optional product.

In the present embodiment, all of a plurality of batteries used by the electronic device 10 may be built-in batteries or may be external batteries. The number of batteries used by the electronic device 10 may be greater than two. In the description below, the electronic device 10 uses two batteries, which are the built-in battery 12 and the external battery 13.

The power supply input port 11 is a terminal for receiving power supply from an external power supply. For example, the power supply input port 11 is coupled with an AC power supply cable for supplying power from an external AC power supply.

The battery control unit 14 includes, for example, one or more ICs having a CPU, a ROM, a RAM, and the like, and other memories and electronic circuits. The battery control unit 14 realizes battery condition display processing described later by hardware or cooperation of hardware and a program. The battery control unit 14 has an authentication unit 15 that performs authentication processing of the external battery 13 as one of its functions. The battery control unit 14 may be composed of an ACIC (Application Specific Integrated Circuit).

The display unit 16 is a display apparatus for displaying visual information. The display unit 16 is, for example, an LCD (Liquid Crystal Display). The display unit 16 also functions as a touch panel for receiving an operation from a user. Therefore, the display unit 16 may be called an operation panel of the electronic device 10. The communication IF 18 is a general term for one or a plurality of IFs for the electronic device 10 to perform communication with the outside in compliance with a predetermined communication protocol including known communication standards.

The print processing unit 17 is a mechanism that performs printing on a print medium based on print data acquired from the outside through the communication IF 18. As is well known, the print processing unit 17 performs printing by causing color material such as ink or toner to adhere onto a print medium such as a paper sheet. When the electronic device 10 is a scanner, the electronic device 10 has a configuration including a light source, an optical system, an image capturing element, and the like, which are required to read an original document.

2. Battery Control Processing

"Battery control processing" performed by the battery control unit 14 will be described. The battery control processing is processing that charges a battery selected from a plurality of batteries and processing that makes a battery selected from a plurality of batteries a power feeding source.

The battery control unit 14 switches a condition of the electronic device 10 to either an "external power supply drive mode" or a "battery drive mode" according to whether or not power is inputted into the power supply input port 11 the from the outside. When the power is inputted into the power supply input port 11 from the outside, the battery control unit 14 employs the external power supply drive mode, and when the power is not inputted into the power supply input port 11 from the outside, the battery control unit 14 employs the battery drive mode.

In the external power supply drive mode, the battery control unit 14 causes the electronic device 10 to be driven by supplying power inputted from the power supply input port 11 to each unit of the electronic device 10. In addition, in the external power supply drive mode, the battery control unit 14 selects the built-in battery 12 and the external battery 13 as batteries to be charged according to a predetermined "charging priority policy" and charges the selected batteries by power inputted from the power supply input port 11.

In the battery drive mode, the battery control unit 14 selects either the built-in battery 12 or the external battery 13 as a power feeding source according to a predetermined "power feeding source priority policy" and causes the selected battery to discharge. In other words, the battery control unit 14 causes the electronic device 10 to be driven by power supplied from the battery selected as the power feeding source.

According to the charging priority policy, the battery control unit 14 causes the external battery 13 to be a battery to be charged more preferentially than the built-in battery 12 when the external battery 13 is coupled to the electronic device 10. The battery control unit 14 causes the built-in battery 12 to be a battery to be charged when the external battery 13 is not coupled to the electronic device 10 or when the external battery 13 coupled to the electronic device 10 is fully charged.

However, the charging priority policy is not limited to content described above. For example, when the remaining power of the built-in battery 12 is lower than "near end", the charging priority policy may preferentially cause the built-in battery 12 to be a battery to be charged even if the external battery 13 is coupled to the electronic device 10. Further, for example, even if the external battery 13 is coupled to the electronic device 10, when the remaining power of the external battery 13 is higher than or equal to the near end and the remaining power of the built-in battery 12 is lower than the near end, the charging priority policy may preferentially cause the built-in battery 12 to be a battery to be charged. When the battery control unit 14 causes the built-in battery 12 to be a battery to be charged more preferentially than the external battery 13, the battery control unit 14 causes the external battery 13 to be a battery to be charged when the remaining power of the built-in battery 12 is higher than or equal to "near full" or is fully charged. Here, the near end is the remaining power corresponding to a predetermined charging rate near the end (the remaining power is 0%) of the battery. The near full is the remaining power corresponding to a predetermined charging rate near a fully charged state of the battery.

According to the power feeding source priority policy, the battery control unit 14 causes the external battery 13 to be a power feeding source more preferentially than the built-in battery 12 when the external battery 13 is coupled to the electronic device 10. The battery control unit 14 causes the built-in battery 12 to be a power feeding source when the external battery 13 is not coupled to the electronic device 10 or when the remaining power of the external battery 13 coupled to the electronic device 10 is lower than the near end or is the end.

Of course, the battery control unit 14 can acquire the remaining power of each of a plurality of batteries at any time by monitoring the batteries, respectively. The battery control unit 14 can estimate the remaining power of each of the built-in battery 12 and the external battery 13 by, for example, detecting a voltage of each of the built-in battery 12 and the external battery 13 and being based on each of the detected voltages. The remaining power of the battery can be indicated by a current charging rate when the fully charged state of the battery is 100%. For an estimation method (acquisition method) of the remaining power of the battery, various methods including known methods can be employed.

3. Battery Condition Display Processing

Next, "battery condition display processing" performed by the battery control unit 14 will be described. The battery control unit 14 performs the battery condition display processing along with the battery control processing described above. The battery condition display processing corresponds to a battery condition display method.

FIG. 2 is a flowchart showing the battery condition display processing performed by the battery control unit 14 in the external power supply drive mode.

In step S100, the battery control unit 14 determines whether or not the external battery 13 is coupled to the electronic device 10. In other words, the battery control unit 14 determines the presence or absence of the external battery 13. When the battery control unit 14 determines that the external battery 13 is present ("Yes" in step S100), the battery control unit 14 proceeds to step S110, and when the battery control unit 14 determines that the external battery 13 is absent ("No" in step S100), the battery control unit 14 proceeds to step S170.

In step S110, the battery control unit 14 determines whether or not the battery currently selected as a battery to be charged according to the charging priority policy is the external battery 13. When the battery control unit 14 charges the external battery 13 as the battery to be charged, the battery control unit 14 proceeds to step S120 from the determination "Yes" in step S110. On the other hand, when the battery control unit 14 charges the built-in battery 12 as the battery to be charged, the battery control unit 14 proceeds to step S130 from the determination "No" in step S110.

When "Yes" is determined in step S110, the external battery 13 is a "first battery" selected as the battery to be charged or the power feeding source among a plurality of batteries, and the built-in battery 12 is a "second battery" that does not correspond to the first battery. On the other hand, when "No" is determined in step S110, the built-in battery 12 is the "first battery", and the external battery 13 is the "second battery".

In step S120, the battery control unit 14 determines whether or not the remaining power of the built-in battery 12 is lower than a predetermined threshold value. When the remaining power of the built-in battery 12 is lower than the predetermined threshold value ("Yes" in step S120), the battery control unit 14 proceeds to step S140, and when the remaining power of the built-in battery 12 is higher than or equal to the predetermined threshold value ("No" in step S120), the battery control unit 14 proceeds to step S150. The threshold values used for determination in step S120 and steps S130, S220, and S230 described later may be predetermined values indicating that the remaining power of the built-in battery 12 is low. For example, the threshold values are values indicating near end.

In step S140, the battery control unit 14 causes the display unit 16 to display a battery condition for each of the first battery and the second battery. Specifically, the battery control unit 14 causes the display unit 16 to display the remaining power of the external battery 13 which is the first battery and the remaining power of the built-in battery 12 which is the second battery.

FIG. 4 illustrates a relationship between icons showing conditions of the built-in battery 12 and the external battery 13, respectively, and a meaning of the icons. According to the example of FIG. 4, the icon 30 of the built-in battery 12 and the icon 40 of the external battery 13 are illustrations of an outer shape imitating a battery, and the level of the remaining power (the remaining power level) is indicated by the number and color of rectangles and the like in the illustrations. According to the example of FIG. 4, each of the icons 30 and 40 are classified into a remaining power level 3 where the remaining power is the highest, a remaining power level 2 where the remaining power is the second highest following the remaining power level 3, a remaining power level 1 where the remaining power is the third highest following the remaining power level 2, and a remaining power level slight where the remaining power is the lowest.

According to the example of FIG. 4, the remaining power level 3 is indicated by an icon where the number of the rectangles is three, the remaining power level 2 is indicated by an icon where the number of the rectangles is two, and the remaining power level 1 is indicated by an icon where the number of the rectangles is 1. The remaining power level slight is indicated by an icon where the number of the rectangles is 1 and the color of the rectangle is different from that of the other remaining power levels. When the fully charged state is 100%, for example, the remaining power level 3 indicates a remaining power of 60% or more, the remaining power level 2 indicates a remaining power of less than 60% and more than or equal to 20%, the remaining power level 1 indicates a remaining power of less than 20% and more than or equal to 5%, and the remaining power level slight indicates a remaining power of less than 5%. The remaining power level slight may be defined to correspond to a remaining power of less than the near end.

According to the example of FIG. 4, when both the batteries are being charged, both the icons 30 and 40 becomes a state where an illustration imitating a bolt of lightning that means in charging is further overlapped. According to the example of FIG. 4, the icon 40 is larger than the icon 30. This is because the capacity of the external battery 13 is larger than that of the built-in battery 12. That is, a user intuitively recognizes that the icons 30 and 40 indicate the built-in battery 12 and the external battery 13, respectively, from a size difference between the icons 30 and 40.

According to the example of FIG. 4, the icon 30 may have a form that means temperature abnormality or the like. The icon 40 may have a form that means temperature abnormality or the like and a form that means authentication failure. The icons of the temperature abnormality and the authentication failure will be described later in association with FIGS. 9 to 11.

In step S140, the battery control unit 14 causes the display unit 16 to display any icon 40 corresponding to the remaining power of the external battery 13 that is being charged among the icons 40 of the external battery 13 as illustrated in FIG. 4. Further, in step S140, the battery control unit 14 causes the display unit 16 to display any icon 30 corresponding to the remaining power of the built-in battery 12 that is not being charged among the icons 30 of the built-in battery 12 as illustrated in FIG. 4, for example, an icon 30 corresponding to the remaining power level slight.

In step S150, the battery control unit 14 causes the display unit 16 to display a battery condition of the first battery. Specifically, the battery control unit 14 causes the display unit 16 to display the remaining power of the external battery 13 which is the first battery. In this case, the battery control unit 14 causes the display unit 16 to display any icon 40 corresponding to the remaining power of the external battery 13 that is being charged among the icons 40 of the external battery 13 as illustrated in FIG. 4. In step S150, the battery control unit 14 does not cause the display unit 16 to display the remaining power of the second battery.

In step S130, the battery control unit 14 determines whether or not the remaining power of the external battery 13 is lower than a predetermined threshold value. When the remaining power of the external battery 13 is lower than the predetermined threshold value ("Yes" in step S130), the battery control unit 14 proceeds to step S160, and when the remaining power of the external battery 13 is higher than or equal to the predetermined threshold value ("No" in step S130), the battery control unit 14 proceeds to step S170.

In step S160, the battery control unit 14 causes the display unit 16 to display a battery condition for each of the first battery and the second battery. Specifically, the battery control unit 14 causes the display unit 16 to display the remaining power of the built-in battery 12 which is the first battery and the remaining power of the external battery 13 which is the second battery. In this case, the battery control unit 14 causes the display unit 16 to display any icon 30 corresponding to the remaining power of the built-in battery 12 that is being charged among the icons 30 of the built-in battery 12 as illustrated in FIG. 4. Further, the battery control unit 14 causes the display unit 16 to display any icon 40 corresponding to the remaining power of the external battery 13 that is not being charged among the icons 40 of the external battery 13 as illustrated in FIG. 4, for example, an icon 40 corresponding to the remaining power level slight.

In step S170, the battery control unit 14 causes the display unit 16 to display a battery condition of the first battery. Specifically, the battery control unit 14 causes the display unit 16 to display the remaining power of the built-in battery 12 which is the first battery. In this case, the battery control unit 14 causes the display unit 16 to display any icon 30 corresponding to the remaining power of the built-in battery 12 that is being charged among the icons 30 of the built-in battery 12 as illustrated in FIG. 4. In step S170, the battery control unit 14 does not cause the display unit 16 to display the remaining power of the second battery.

After each of steps S140, S150, S160, and S170, the battery control unit 14 performs the determination of step S100 again. In other words, in the external power supply drive mode, an operation is repeated in which one of steps S140, S150, S160, and S170 is performed according to a result of each determination of steps S100, S110, S120, and S130. Thereby, display content of battery remaining power on the display unit 16 is maintained or changed according to conditions of the built-in battery 12 and the external battery 13.

FIG. 3 is a flowchart showing the battery condition display processing performed by the battery control unit 14 in the battery drive mode.

In step S200, the battery control unit 14 determines the presence or absence of the external battery 13 in the same manner as in step S100. When the battery control unit 14 determines that the external battery 13 is present ("Yes" in step S200), the battery control unit 14 proceeds to step S210, and when the battery control unit 14 determines that the external battery 13 is absent ("No" in step S200), the battery control unit 14 proceeds to step S270.

In step S210, the battery control unit 14 determines whether or not the battery currently selected as a power feeding source is the external battery 13 according to the power feeding source priority policy. When the external battery 13 is selected as the power feeding source, the battery control unit 14 proceeds to step S220 from the determination "Yes" in step S210. On the other hand, when the built-in battery 12 is selected as the power feeding source, the battery control unit 14 proceeds to step S230 from the determination "No" in step S210.

When "Yes" is determined in step S210, the external battery 13 is the "first battery" and the built-in battery 12 is the "second battery". On the other hand, when "No" is determined in step S210, the built-in battery 12 is the "first battery" and the external battery 13 is the "second battery".

In step S220, the battery control unit 14 determines whether or not the remaining power of the built-in battery 12 is lower than a predetermined threshold value in the same manner as in step S120. When the remaining power of the built-in battery 12 is lower than the predetermined threshold value ("Yes" in step S220), the battery control unit 14 proceeds to step S240, and when the remaining power of the built-in battery 12 is higher than or equal to the predetermined threshold value ("No" in step S220), the battery control unit 14 proceeds to step S250.

In step S240, the battery control unit 14 causes the display unit 16 to display a battery condition for each of the first battery and the second battery. Specifically, the battery control unit 14 causes the display unit 16 to display the remaining power of the external battery 13 which is the first battery and the remaining power of the built-in battery 12 which is the second battery. In this case, the battery control unit 14 causes the display unit 16 to display any icon 40 corresponding to the remaining power of the external battery 13 that is not being charged among the icons 40 of the external battery 13 as illustrated in FIG. 4. Further, the battery control unit 14 causes the display unit 16 to display any icon 30 corresponding to the remaining power of the built-in battery 12 that is not being charged among the icons 30 of the built-in battery 12 as illustrated in FIG. 4, for example, an icon 30 corresponding to the remaining power level slight.

In step S250, the battery control unit 14 causes the display unit 16 to display a battery condition of the first battery. Specifically, the battery control unit 14 causes the display unit 16 to display the remaining power of the external battery 13 which is the first battery. In this case, the battery control unit 14 causes the display unit 16 to display any icon 40 corresponding to the remaining power of the external battery 13 that is not being charged among the icons 40 of the external battery 13 as illustrated in FIG. 4. In step S250, the battery control unit 14 does not cause the display unit 16 to display the remaining power of the second battery.

In step S230, the battery control unit 14 determines whether or not the remaining power of the external battery 13 is lower than a predetermined threshold value in the same manner as in step S130. When the remaining power of the external battery 13 is lower than the predetermined threshold value ("Yes" in step S230), the battery control unit 14 proceeds to step S260, and when the remaining power of the external battery 13 is higher than or equal to the predetermined threshold value ("No" in step S230), the battery control unit 14 proceeds to step S270.

In step S260, the battery control unit 14 causes the display unit 16 to display a battery condition for each of the first battery and the second battery. Specifically, the battery control unit 14 causes the display unit 16 to display the remaining power of the built-in battery 12 which is the first battery and the remaining power of the external battery 13 which is the second battery. In this case, the battery control unit 14 causes the display unit 16 to display any icon 30 corresponding to the remaining power of the built-in battery 12 that is not being charged among the icons 30 of the built-in battery 12 as illustrated in FIG. 4. Further, the battery control unit 14 causes the display unit 16 to display any icon 40 corresponding to the remaining power of the external battery 13 that is not being charged among the icons 40 of the external battery 13 as illustrated in FIG. 4, for example, an icon 40 corresponding to the remaining power level slight.

In step S270, the battery control unit 14 causes the display unit 16 to display a battery condition of the first battery. Specifically, the battery control unit 14 causes the display unit 16 to display the remaining power of the built-in battery 12 which is the first battery. In this case, the battery control unit 14 causes the display unit 16 to display any icon 30 corresponding to the remaining power of the built-in battery 12 that is not being charged among the icons 30 of the built-in battery 12 as illustrated in FIG. 4. In step S270, the battery control unit 14 does not cause the display unit 16 to display the remaining power of the second battery.

According to the power feeding source priority policy described above, the battery control unit 14 causes the built-in battery 12 to be a power feeding source when the remaining power of the external battery 13 is lower than the near end or is the end in a situation where the external battery 13 is coupled to the electronic device 10. Therefore, according to the power feeding source priority policy described above, it can be said that "No" determination in step S230 never occurs. Therefore, the battery control unit 14 may directly proceed to step S260 from "No" determination of step S210. However, the power feeding source priority policy is not limited to content described above. For example, when assuming that a user changes the power feeding source priority policy so that the built-in battery 12 is set to the power feeding source more preferentially than the external battery 13, it cannot be said that the determination in step S230 is useless.

After each of steps S240, S250, S260, and S270, the battery control unit 14 performs the determination of step S200 again. In other words, in the battery drive mode, an operation is repeated in which one of steps S240, S250, S260, and S270 is performed according to a result of each determination of steps S200, S210, S220, and S230. Thereby, display content of battery remaining power on the display unit 16 is maintained or changed according to conditions of the built-in battery 12 and the external battery 13.

4. Display Example by Battery Condition Display Processing

FIG. 5 shows a first example of a user interface (UI) screen 20 which the battery control unit 14 causes the display unit 16 to display. The UI screen 20 is a screen for displaying various information related to the electronic device 10 by characters and illustrations and receiving an operation from a user. For example, the UI screen 20 includes a display field of ink remaining amount of each color in the print processing unit 17. Further, the UI screen 20 includes a menu display field 24 where a user performs an arbitrary setting for the electronic device 10. Further, the UI screen 20 includes partial areas 21, 22, and 23 for displaying various icons in an area near the upper end of the screen. The boundaries between the partial areas 21, 22, and 23 are not necessarily clear. However, the partial area 21 of the partial areas 21, 22, and 23 is an area that is secured in advance in order to display remaining power of a battery as an icon.

In the battery condition display processing, in a situation where the battery control unit 14 displays the remaining power of the first battery, that is, in steps S150, S170, S250, and S270, the battery control unit 14 displays an icon corresponding to the remaining power of the first battery in the partial area 21. On the other hand, in a situation where the remaining power of the first battery and the remaining power of the second battery are displayed, that is, in steps S140, S160, S240, and S260, the battery control unit 14 may alternately display the remaining power of the first battery and the remaining power of the second battery in the partial area 21.

As a specific example, FIG. 5 shows a situation where the icon 30 corresponding to the remaining power of the built-in battery 12 and the icon 40 corresponding to the remaining power of the external battery 13 are alternately displayed in the partial area 21 in step S260. In steps S140, S160, S240, and S260, the battery control unit 14 switchingly displays the icon 30 and the icon 40 in the partial area 21, for example, every 5 seconds.

Figure 6:
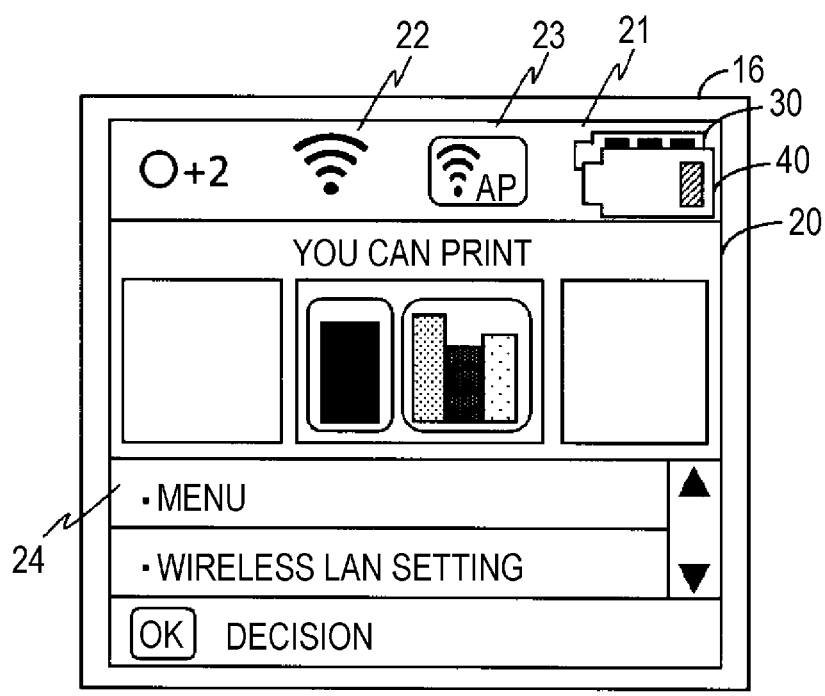
FIG. 6 is a diagram showing a UI screen of a second example.

FIG. 6 shows a second example of the UI screen 20. In the battery condition display processing, in a situation where the battery control unit 14 displays the remaining power of the first battery and the remaining power of the second battery, the battery control unit 14 may display the remaining power of the first battery and the remaining power of the second battery, which are partially overlapped, in the partial area 21. As a specific example, FIG. 6 shows a situation where the icon 30 corresponding to the remaining power of the built-in battery 12 and the icon 40 corresponding to the remaining power of the external battery 13 are displayed in the partial area 21 in a state where the icon 30 and the icon 40 are partially overlapped in step S260.

FIG. 7 shows a third example of the UI screen 20. In the battery condition display processing, in a situation where the battery control unit 14 displays the remaining power of the first battery and the remaining power of the second battery, the battery control unit 14 may display the remaining power of the first battery in the partial area 21 and the remaining power of the second battery in the partial area 23. The partial area 21 corresponds to a first area which is a partial area of the display unit 16. The partial area 23 corresponds to an example of a second area which is a partial area different from the first area of the display unit 16 and which is for displaying other information.

As a specific example, FIG. 7 shows a situation where the icon 30 corresponding to the remaining power of the built-in battery 12 is displayed in the partial area 21 and the icon 40 corresponding to the remaining power of the external battery 13 is displayed in the partial area 23 in step S260. As known from FIGS. 5 and 6, the partial area 23 is originally an area for displaying an icon of simple AP mode, where an illustration representing radio waves and characters "AP" are combined. The simple AP mode is a mode where the electronic device 10 itself functions as an access point corresponding to Wi-Fi standard that is one of wireless LAN (Local Area Network) standards. Further, as known from FIGS. 5 and 6, the partial area 22 is originally an area for displaying an icon of the Wi-Fi mode, which is an illustration representing radio waves. The Wi-Fi mode is a mode where the electronic device 10 performs wireless communication of the Wi-Fi standard through an external access point.

In the example of FIG. 7, the battery control unit 14 displays the icon 40 of the external battery as the second battery in the partial area 23 which has been an area for displaying the icon of the simple AP mode. Further, the battery control unit 14 switchingly displays the icon of the simple AP mode and the icon of the Wi-Fi mode in the partial area 22, for example, every 5 seconds, by interlocking with use of the partial area 23 for displaying the icon of the second battery (see FIG. 7). In this way, when the battery control unit 14 displays the remaining power of the first battery in the partial area 21 and the remaining power of the second battery in the partial area 23 in steps S140, S160, S240, and S260, the battery control unit 14 displays the icon that should be originally displayed in the partial area 23 and the icon that should be originally displayed in another partial area 22 alternately in the other partial area 22.

As shown in the example of FIG. 7, the battery control unit 14 may restrict the use of the partial area 23 for displaying the icon of the second battery within a case where the menu of "wireless LAN setting" is not selected by a user in the menu display field 24. Specifically, even in a situation where the remaining power of the first battery and the remaining power of the second battery will be displayed in step S260 or the like, while the menu of "wireless LAN setting" is selected in the menu display field 24, the battery control unit 14 displays the icon of the first battery in the partial area 21 and displays the icon of the Wi-Fi mode and the icon of the simple AP mode, which should be originally displayed, in the partial areas 22 and 23. On the other hand, in a situation where the remaining power of the first battery and the remaining power of the second battery are displayed in step S260 or the like, while the menu of "wireless LAN setting" is not selected in the menu display field 24, the battery control unit 14 displays the icon of the first battery in the partial area 21 and displays the icon of the second battery in the partial area 23 as shown in the example of FIG. 7.

FIG. 8 shows a fourth example of the UI screen 20. In the first to the third examples described with reference to FIGS. 5 to 7, remaining power of a battery is displayed by an icon. However, at least a partial display of battery remaining power may be a display by a character string, that is, a message. In the battery condition display processing, in a situation where the battery control unit 14 displays the remaining power of the first battery and the remaining power of the second battery, the battery control unit 14 may display the remaining power of the second battery by a message and display the remaining power of the first battery by an icon.

As a specific example, FIG. 8 shows a situation where in step S260, a message 25 "REMAINING POWER OF EXTERNAL BATTERY IS EMPTY, SO THAT OPERATION IS PERFORMED BY BUILT-IN BATTERY." which describes the remaining power of the external battery 13 used as the second battery is displayed in the UI screen 20 and the icon 30 corresponding to the remaining power of the built-in battery 12 used as the first battery is displayed in the partial area 21. When the battery control unit 14 receives a predetermined operation to erase message through the UI screen 20 in a state where the message 25 is displayed, the battery control unit 14 erases the message 25 and restores the UI screen 20 including the menu display field 24 and the like.

5. Battery Condition Display Processing Including Abnormal Condition Display

The battery condition display processing and specific display examples described above are called a first embodiment for convenience.

Hereinafter, battery condition display processing according to a second embodiment will be described. Regarding the second embodiment, description of contents common to the description described above will be appropriately omitted.

As a premise of the second embodiment, the battery control unit 14 performs abnormality determination of whether or not each of a plurality of batteries is in a predetermined abnormal condition. The abnormality determination is, for example, determination based on battery temperature. The battery control unit 14 acquires battery temperature of each battery such as the built-in battery 12 and the external battery 13 from temperature sensors (not shown in the drawings) arranged close to each battery. The battery control unit 14 determines that a battery whose temperature is out of a predetermined appropriate numerical range of battery temperature is in an abnormal condition because the battery temperature is too high or too low (abnormal).

The abnormality determination is, for example, safety authentication of the external battery 13. The authentication unit 15 of the battery control unit 14 performs authentication processing on the external battery 13 at a timing when detecting that the external battery 13 is coupled to the electronic device 10. The authentication unit 15 acquires various information related to the external battery 13 from an IC chip or the like included in the external battery 13. When the information acquired from the external battery 13 includes safety guarantee information indicating that the external battery 13 is a product guaranteed to operate safely, the authentication unit 15 authenticates the external battery 13. The safety guarantee information is, for example, a predetermined product number or a specific character string. When the information acquired from the external battery 13 does not include the safety guarantee information, the authentication unit 15 does not authenticate the external battery 13. The battery control unit 14 determines that the external battery 13 that is not authenticated by the authentication unit 15 is in an abnormal condition.

When the battery control unit 14 selects a battery to be charged according the charging priority policy or selects a power feeding source battery according the power feeding source priority policy in the battery control processing, the battery control unit 14 excludes a battery determined to be in an abnormal condition from selection options. All the batteries recognized by the battery control unit 14 may be in an abnormal condition. However, such a case is a critical error, so that the electronic device 10 separately takes a predetermined measure to cope with the critical error. In the description of the second embodiment, it is assumed that one or more batteries recognized by the battery control unit 14 are not in an abnormal condition.

Figure 9:
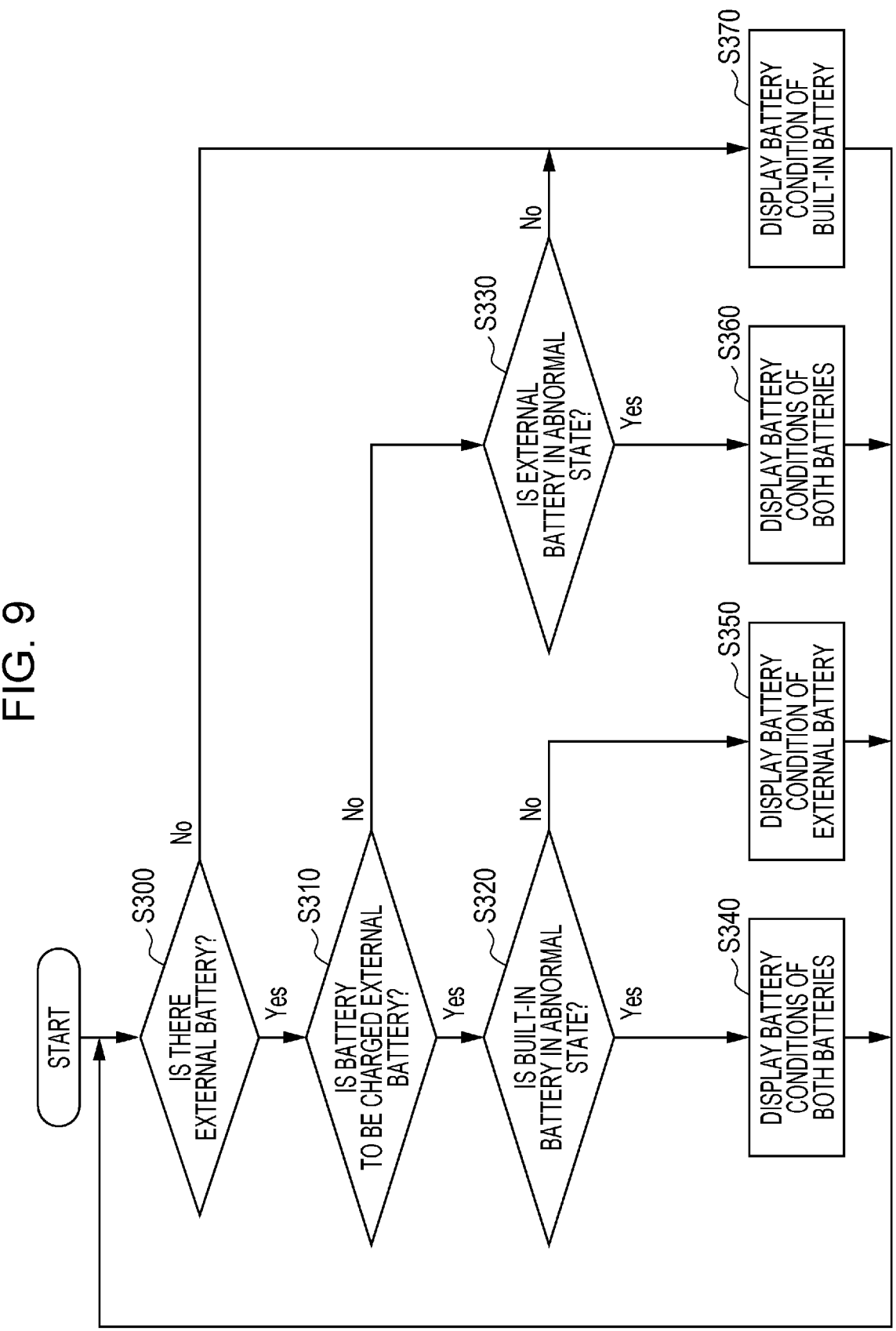
FIG. 9 is a flowchart showing battery condition display processing of a second embodiment in the external power supply drive mode.

FIG. 9 is a flowchart showing the battery condition display processing of the second embodiment performed by the battery control unit 14 in the external power supply drive mode.

In step S300, the battery control unit 14 determines the presence or absence of the external battery 13 in the same manner as in step S100. When the battery control unit 14 determines that the external battery 13 is present ("Yes" in step S300), the battery control unit 14 proceeds to step S310, and when the battery control unit 14 determines that the external battery 13 is absent ("No" in step S300), the battery control unit 14 proceeds to step S370.

In step S310, the battery control unit 14 determines whether or not the battery currently selected as a battery to be charged according to the charging priority policy is the external battery 13. When the battery control unit 14 selects the external battery 13 as the battery to be charged, the battery control unit 14 proceeds to step S320 from the determination "Yes" in step S310. On the other hand, when the battery control unit 14 selects the built-in battery 12 as the battery to be charged, the battery control unit 14 proceeds to step S330 from the determination "No" in step S310.

In step S320, the battery control unit 14 determines whether or not the built-in battery 12 is in an abnormal condition. When the built-in battery 12 is in an abnormal condition ("Yes" in step S320), the battery control unit 14 proceeds to step S340, and when the built-in battery 12 is not in an abnormal condition ("No" in step S320), the battery control unit 14 proceeds to step S350.

In step S340, the battery control unit 14 causes the display unit 16 to display a battery condition for each of the first battery and the second battery. Specifically, the battery control unit 14 causes the display unit 16 to display the remaining power of the external battery 13 which is the first battery and a warning related to the built-in battery 12 which is the second battery. In this case, the battery control unit 14 causes the display unit 16 to display any icon 40 corresponding to the remaining power of the external battery 13 that is being charged among the icons 40 of the external battery 13 as illustrated in FIG. 4. Further, the battery control unit 14 causes the display unit 16 to display an icon 30 that means a temperature abnormality or the like from among the icons 30 of the built-in battery 12 as illustrated in FIG. 4.

In step S350, the battery control unit 14 causes the display unit 16 to display a battery condition of the first battery in the same manner as in step S150. Specifically, the battery control unit 14 causes the display unit 16 to display the remaining power of the external battery 13 which is the first battery.

In step S330, the battery control unit 14 determines whether or not the external battery 13 is in an abnormal condition. When the external battery 13 is in an abnormal condition ("Yes" in step S330), the battery control unit 14 proceeds to step S360, and when the external battery 13 is not in an abnormal condition ("No" in step S330), the battery control unit 14 proceeds to step S370.

In step S360, the battery control unit 14 causes the display unit 16 to display a battery condition for each of the first battery and the second battery. Specifically, the battery control unit 14 causes the display unit 16 to display the remaining power of the built-in battery 12 which is the first battery and a warning related to the external battery 13 which is the second battery. In this case, the battery control unit 14 causes the display unit 16 to display any icon 30 corresponding to the remaining power of the built-in battery 12 that is being charged among the icons 30 of the built-in battery 12 as illustrated in FIG. 4. Further, the battery control unit 14 causes the display unit 16 to display either one of the icon 40 that means temperature abnormality or the like and the icon 40 that means authentication failure of the external battery 13 as illustrated in FIG. 4 according to a reason for determination that the external battery 13 is in an abnormal condition.

In step S370, the battery control unit 14 causes the display unit 16 to display a battery condition of the first battery in the same manner as in step S170. Specifically, the battery control unit 14 causes the display unit 16 to display the remaining power of the built-in battery 12 which is the first battery. After each of steps S340, S350, S360, and S370, the battery control unit 14 performs the determination of step S300 again.

Figure 10:
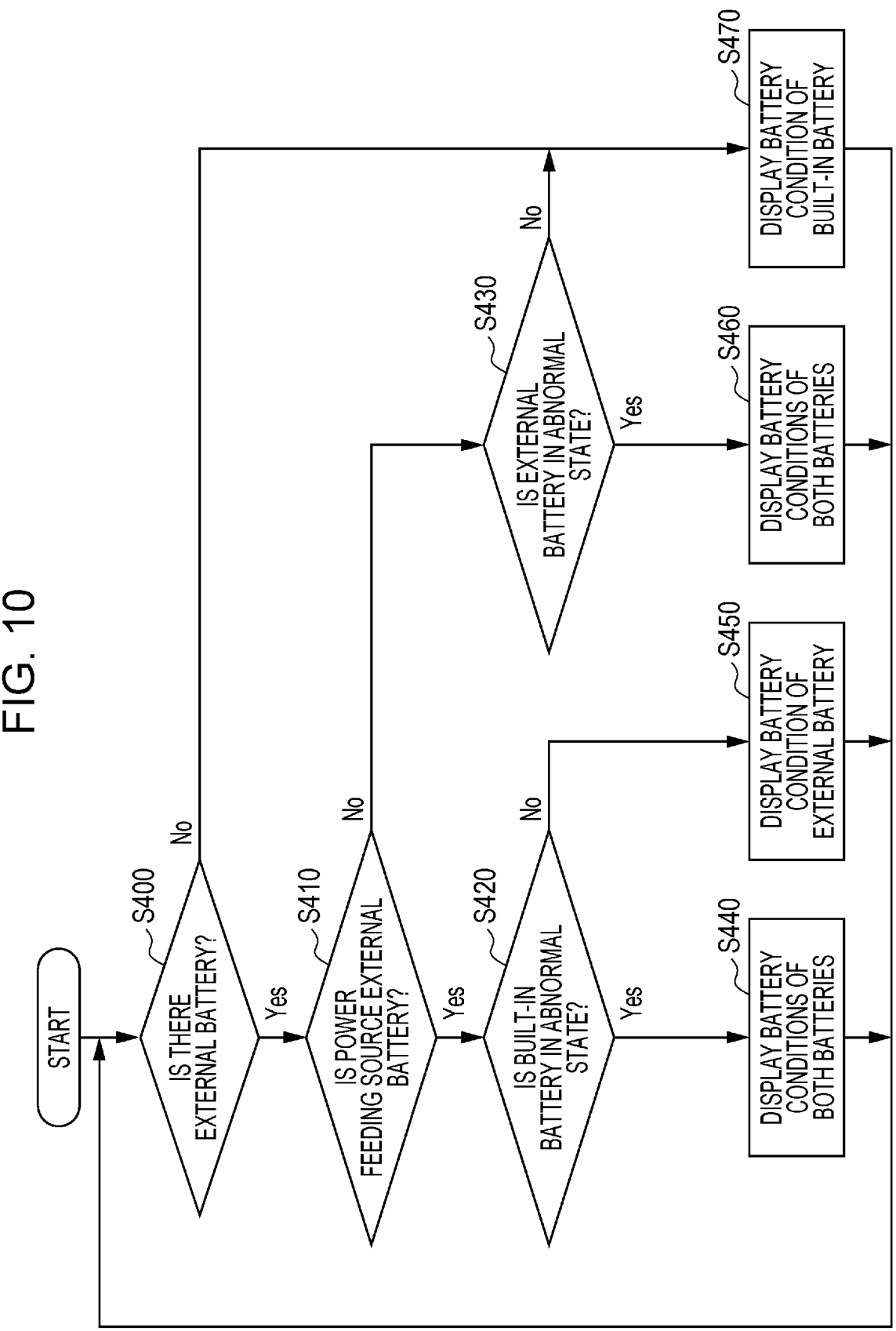
FIG. 10 is a flowchart showing battery condition display processing of the second embodiment in the battery drive mode.

FIG. 10 is a flowchart showing the battery condition display processing of the second embodiment performed by the battery control unit 14 in the battery drive mode.

In step S400, the battery control unit 14 determines the presence or absence of the external battery 13 in the same manner as in step S200. When the battery control unit 14 determines that the external battery 13 is present ("Yes" in step S400), the battery control unit 14 proceeds to step S410, and when the battery control unit 14 determines that the external battery 13 is absent ("No" in step S400), the battery control unit 14 proceeds to step S470.

In step S410, the battery control unit 14 determines whether or not the battery currently selected as a power feeding source is the external battery 13 according to the power feeding source priority policy. When the external battery 13 is selected as the power feeding source, the battery control unit 14 proceeds to step S420 from the determination "Yes" in step S410. On the other hand, when the built-in battery 12 is selected as the power feeding source, the battery control unit 14 proceeds to step S430 from the determination "No" in step S410.

In step S420, the battery control unit 14 determines whether or not the built-in battery 12 is in an abnormal condition in the same manner as in step S320. When the built-in battery 12 is in an abnormal condition ("Yes" in step S420), the battery control unit 14 proceeds to step S440, and when the built-in battery 12 is not in an abnormal condition ("No" in step S420), the battery control unit 14 proceeds to step S450.

In step S440, the battery control unit 14 causes the display unit 16 to display a battery condition for each of the first battery and the second battery. Specifically, the battery control unit 14 causes the display unit 16 to display the remaining power of the external battery 13 which is the first battery and a warning related to the built-in battery 12 which is the second battery. In this case, the battery control unit 14 causes the display unit 16 to display any icon 40 corresponding to the remaining power of the external battery 13 that is not being charged among the icons 40 of the external battery 13 as illustrated in FIG. 4. Further, the battery control unit 14 causes the display unit 16 to display an icon 30 that means a temperature abnormality or the like from among the icons 30 of the built-in battery 12 as illustrated in FIG. 4.

In step S450, the battery control unit 14 causes the display unit 16 to display a battery condition of the first battery in the same manner as in step S250. Specifically, the battery control unit 14 causes the display unit 16 to display the remaining power of the external battery 13 which is the first battery.

In step S430, the battery control unit 14 determines whether or not the external battery 13 is in an abnormal condition in the same manner as in step S330. When the external battery 13 is in an abnormal condition ("Yes" in step S430), the battery control unit 14 proceeds to step S460, and when the external battery 13 is not in an abnormal condition ("No" in step S430), the battery control unit 14 proceeds to step S470.

In step S460, the battery control unit 14 causes the display unit 16 to display a battery condition for each of the first battery and the second battery. Specifically, the battery control unit 14 causes the display unit 16 to display the remaining power of the built-in battery 12 which is the first battery and a warning related to the external battery 13 which is the second battery. In this case, the battery control unit 14 causes the display unit 16 to display any icon 30 corresponding to the remaining power of the built-in battery 12 that is not being charged among the icons 30 of the built-in battery 12 as illustrated in FIG. 4. Further, the battery control unit 14 causes the display unit 16 to display either one of the icon 40 that means temperature abnormality or the like and the icon 40 that means authentication failure of the external battery 13 as illustrated in FIG. 4 according to a reason for determination that the external battery 13 is in an abnormal condition.

In step S470, the battery control unit 14 causes the display unit 16 to display a battery condition of the first battery in the same manner as in step S270. Specifically, the battery control unit 14 causes the display unit 16 to display the remaining power of the built-in battery 12 which is the first battery. After each of steps S440, S450, S460, and S470, the battery control unit 14 performs the determination of step S4400 again.

FIG. 11 shows a fifth example of the UI screen 20 which the battery control unit 14 causes the display unit 16 to display. The UI screen 20 of the fifth embodiment is a screen corresponding to the second embodiment. In the battery condition display processing of the second embodiment, in a situation where the battery control unit 14 displays the remaining power of the first battery, that is, in steps S350, S370, S450, and S470, the battery control unit 14 displays an icon corresponding to the remaining power of the first battery in the partial area 21 in the same manner as in the first embodiment. On the other hand, in a situation where the remaining power of the first battery and the remaining power of the second battery are displayed, that is, in steps S340, S360, S440, and S460, the battery control unit 14 may alternately display the remaining power of the first battery and a warning related to the second battery in the partial area 21.

As a specific example, FIG. 11 shows a situation where the icon 30 corresponding to the remaining power of the built-in battery 12 and the icon 40 of a warning related to the external battery 13 (the icon 40 that means authentication failure) are alternately displayed in the partial area 21 in step S460. In steps S340, S360, S440, and S460, the battery control unit 14 switchingly displays the icon 30 and the icon 40 in the partial area 21, for example, every 5 seconds. Of course, also in the second embodiment, the remaining power of the first battery and a warning related to the second battery can be displayed by an icon and a message as in the UI screen 20 (FIGS. 6 to 8).

6. Conclusion

As described above, according to the present embodiment, the electronic device 10 can charge a battery selected from a plurality of batteries and can drive a battery selected from the plurality of batteries as a power feeding source. The electronic device 10 includes the battery control unit 14 and the display unit 16. When the remaining power of the second battery that does not correspond to the first battery selected as the battery to be charged or the power feeding source among the plurality of batteries is higher than or equal to a predetermined threshold value, the battery control unit 14 causes the display unit 16 to display the remaining power of the first battery from among the remaining power of the first battery and the remaining power of the second battery, and when the remaining power of the second battery is lower than the threshold value, the battery control unit 14 causes the display unit 16 to display the remaining power of the first battery and the remaining power of the second battery.

According to the configuration described above, the battery control unit 14 does not at all times displays the remaining power of the second battery on the display unit 16, but displays the remaining power of the first battery and the remaining power of the second battery on the display unit 16 when the remaining power of the second battery is lower than the threshold value. Therefore, it is possible to prevent visibility of the display unit 16 for a user from degrading as much as possible and properly notify the user of much-needed information indicating that the remaining power of the second battery is lower than the threshold value.

According to the present embodiment, when the remaining power of the second battery is lower than the threshold value, the battery control unit 14 may alternately display the remaining power of the first battery and the remaining power of the second battery in a partial area of the display unit 16.

According to the configuration described above, the battery control unit 14 can let a user recognize the remaining power of the first battery and the remaining power of the second battery without using areas other than the partial area of the display unit 16 for display of remaining power of battery.

According to the present embodiment, when the remaining power of the second battery is lower than the threshold value, the battery control unit 14 may display the remaining power of the first battery and the remaining power of the second battery, which are partially overlapped, in a partial area of the display unit 16.

According to the configuration described above, the battery control unit 14 can let a user recognize the remaining power of the first battery and the remaining power of the second battery at the same time without using areas other than the partial area of the display unit 16 for display of remaining power of battery.

According to the present embodiment, when the remaining power of the second battery is lower than the threshold value, the battery control unit 14 may display the remaining power of the first battery in a first area which is a partial area of the display unit 16 and display the remaining power of the second battery in a second area which is a partial area other than the first area of the display unit 16 and is an area for displaying other information.

According to the configuration described above, the battery control unit 14 can let a user recognize the remaining power of the first battery and the remaining power of the second battery at the same time while avoiding increase of information amount included in the display unit 16.

The present embodiment discloses a configuration of a printing apparatus that can charge a battery selected from the built-in battery 12 included in the apparatus and the external battery 13 externally attached to the apparatus and can drive a battery selected from the built-in battery 12 and the external battery 13 as a power feeding source. The printing apparatus includes the battery control unit 14 and the display unit 16. When the remaining power of the second battery that does not correspond to the first battery selected as the battery to be charged or the power feeding source from among the built-in battery 12 and the external battery 13 is higher than or equal to a predetermined threshold value, the battery control unit 14 causes the display unit 16 to display the remaining power of the first battery from among the remaining power of the first battery and the remaining power of the second battery, and when the remaining power of the second battery is lower than the threshold value, the battery control unit 14 causes the display unit 16 to display the remaining power of the first battery and the remaining power of the second battery.

According to the present embodiment, when the second battery that does not correspond to the first battery selected as the battery to be charged or the power feeding source among the plurality of batteries is not in a predetermined abnormal condition, the battery control unit 14 causes the display unit 16 to display the remaining power of the first battery, and when the second battery is in the abnormal condition, the battery control unit 14 causes the display unit 16 to display the remaining power of the first battery and a warning related to the second battery.

According to the configuration described above, the battery control unit 14 does not at all times displays the condition of the second battery on the display unit 16, but displays the remaining power of the first battery and a warning related to the second battery on the display unit 16 when the second battery is in the abnormal condition. Therefore, it is possible to prevent visibility of the display unit 16 for a user from degrading as much as possible and properly notify the user of much-needed information indicating that the second battery is in the abnormal condition.

The remaining power of the battery indirectly indicates how much power is consumed from a fully charged battery capacity. Therefore, displaying the remaining power of the battery is equivalent to displaying power consumption of the battery.

What is claimed is:

1. An electronic device that can charge a battery selected from a plurality of batteries and can drive a battery selected from the plurality of batteries as a power feeding source, the electronic device comprising:
a control unit; and
a display unit, wherein
when a remaining power of a second battery associated with the electronic device that does not correspond to a first battery selected as a battery to be charged or the power feeding source among the plurality of batteries is determined by the control unit to be higher than or equal to a predetermined threshold value by the control unit, the control unit, upon the determination, causes the display unit to display a remaining power of the first battery from among the remaining power of the first battery and the remaining power of the second battery without displaying the remaining power of the second battery, and when the remaining power of the second battery is lower than the threshold value, the control unit causes the display unit to display the remaining power of the first battery and the remaining power of the second battery, and the control unit is configured to select the first battery as either a built-in battery or an external battery based upon a predetermined charging priority policy.

2. The electronic device according to claim 1, wherein when the remaining power of the second battery is lower than the threshold value, the control unit causes a partial area of the display unit to alternately display the remaining power of the first battery and the remaining power of the second battery.

3. The electronic device according to claim 1, wherein when the remaining power of the second battery is lower than the threshold value, the control unit causes a partial area of the display unit to display the remaining power of the first battery and the remaining power of the second battery, which are partially overlapped.

4. The electronic device according to claim 1, wherein when the remaining power of the second battery is lower than the threshold value, the control unit causes a first area, which is a partial area of the display unit, to display the remaining power of the first battery and causes a second area, which is a partial area different from the first area of the display unit and is an area for displaying other information, to display the remaining power of the second battery.

5. A printing apparatus that can charge a battery selected from a built-in battery included in the printing apparatus and an external battery externally attached to the printing apparatus and can drive a battery selected from the built-in battery and the external battery as a power feeding source, the printing apparatus comprising:
   a control unit; and
   a display unit, wherein
   when a remaining power of a second battery associated with the printing apparatus that does not correspond to a first battery selected as a battery to be charged or the power feeding source among the built-in battery and the external battery is determined by the control unit to be higher than or equal to a predetermined threshold value, the control unit, upon the determination, causes the display unit to display a remaining power of the first battery from among the remaining power of the first battery and the remaining power of the second battery without displaying the remaining power of the second battery, and when the remaining power of the second battery is lower than the threshold value, the control unit causes the display unit to display the remaining power of the first battery and the remaining power of the second battery.

6. A battery condition display method performed by an electronic device that can charge a battery selected from a plurality of batteries and can drive a battery selected from the plurality of batteries as a power feeding source, the battery condition display method comprising:
   when a remaining power of a second battery associated with the electronic device that does not correspond to a first battery selected as a battery to be charged or the power feeding source among the plurality of batteries is determined to be higher than or equal to a predetermined threshold value, causing, upon the determination, a display unit to display a remaining power of the first battery from among the remaining power of the first battery and the remaining power of the second battery without displaying the remaining power of the second battery; and
   when the remaining power of the second battery is lower than the threshold value, causing the display unit to display the remaining power of the first battery and the remaining power of the second battery.

7. An electronic device that can charge a battery selected from a plurality of batteries and can drive a battery selected from the plurality of batteries as a power feeding source, the electronic device comprising:
   a control unit; and
   a display unit, wherein
   when a second battery associated with the electronic device that does not correspond to a first battery selected as a battery to be charged or the power feeding source among the plurality of batteries is determined to be not in a predetermined abnormal condition, the control unit causes, upon the determination, the display unit to display a remaining power of the first battery without displaying the remaining power of the second battery, and when the second battery is in the abnormal condition, the control unit causes the display unit to display the remaining power of the first battery and a warning related to the second battery.

* * * * *